US008360323B2

(12) United States Patent
Widzinski, Jr. et al.

(10) Patent No.: US 8,360,323 B2
(45) Date of Patent: Jan. 29, 2013

(54) SECURITY LABEL LAMINATE AND METHOD OF LABELING

(75) Inventors: Thomas J. Widzinski, Jr., Rochester, NY (US); Myra T. Olm, Webster, NY (US); David A. Hodder, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 540 days.

(21) Appl. No.: 12/183,284

(22) Filed: Jul. 31, 2008

(65) Prior Publication Data

US 2010/0025476 A1 Feb. 4, 2010

(51) Int. Cl.
*G06K 19/02* (2006.01)

(52) U.S. Cl. ......................... 235/488; 235/491; 235/487

(58) Field of Classification Search ..................... 283/72
See application file for complete search history.

(56) References Cited

U.S. PATENT DOCUMENTS

| | | | | |
|---|---|---|---|---|
| 5,885,677 | A * | 3/1999 | Gosselin et al. | 428/40.1 |
| 5,959,296 | A | 9/1999 | Cyr et al. | |
| 6,184,534 | B1 | 2/2001 | Stephany et al. | |
| 6,436,314 | B1 | 8/2002 | Oshima et al. | |
| 6,444,068 | B1 * | 9/2002 | Koops et al. | 156/99 |
| 6,514,617 | B1 | 2/2003 | Hubbard et al. | |
| 6,953,206 | B1 * | 10/2005 | Dilz et al. | 283/72 |
| 6,996,252 | B2 | 2/2006 | Reed et al. | |
| 7,030,371 | B2 | 4/2006 | Vasic et al. | |
| 7,068,356 | B2 | 6/2006 | Saglimbeni et al. | |
| 7,079,230 | B1 | 7/2006 | McInerney et al. | |
| 7,892,639 | B2 * | 2/2011 | Mess et al. | 428/354 |
| 2009/0322538 | A1 * | 12/2009 | Kobren et al. | 340/572.8 |

FOREIGN PATENT DOCUMENTS

| | | | |
|---|---|---|---|
| EP | 0 342 982 | A | 11/1989 |
| EP | 1 043 681 | | 10/2000 |
| WO | WO 95/06249 | A | 3/1995 |

OTHER PUBLICATIONS www.flexcon.com.
www.fasson.com.
www.epolin.com.
www.luminescers.com.
www.fabricolorholding.com.
www.maxmax.com.
www.omniplanar.com.
www.ni.com/labview.
www.luminescers.com/products.html.
www.fabricolorholding.com/browse.php.
www.maxmax.com/aSpecialtyInks.htm.
T. Soukka et al.; Photochemical Characterization of Up-Converting Inorganic Lanthanide Phosphors as Potentional Labels; Journal of Fluorescence, vol. 15, No. 4, Jul. 2005, pp. 513-528.

* cited by examiner

*Primary Examiner* — Thien M Le
*Assistant Examiner* — Sonji Johnson
(74) *Attorney, Agent, or Firm* — Nelson Adrian Blish

(57) ABSTRACT

A labeling method for marking a product with invisible information. The label includes a removable laminate formed from a light transmissive layer, and a light transmissive adhesive that detachably affixes the label to a product. The label includes an invisible marker that contains information, detectable by light of selected wavelength. The amount of marker selected is sufficient to allow information in the marker to be detected only when the laminate is affixed over a surface with a selected optical background. The label laminate is removed from the surface of the product and affixed to a surface having the selected optical background and is exposed to light that renders the information in the marker detectable. The method allows covert information in the label laminate to be reliably detected and read with the use of minimal quantities of marker material.

11 Claims, 9 Drawing Sheets

SECURITY LABEL LAMINATE AND METHOD OF LABELING

FIELD OF THE INVENTION

This invention generally relates to a security label and method of labeling, and is specifically concerned with a detachably removable label laminate that requires the incorporation of only a very small percentage of marker material to reliably store and relay invisible information useful in authenticating and identifying a product.

BACKGROUND OF THE INVENTION

If goods are not genuine, then product counterfeiting has occurred. If goods have been diverted from their intended channel of commerce by, for example, entering into a country where the goods are prohibited by contract or by law, then the goods have been subject to product diversion.

Product counterfeiting occurs on artworks, CDs, DVDs, computer software recorded on CDs or diskettes, perfumes, designer clothes, handbags, briefcases, automobile and airplane parts, securities (e.g., stock certificates), identification cards (driver's licenses, passports, visas, green cards), credit cards, smart cards, and pharmaceuticals. According to the World Health Organization, more than 7% of the world's pharmaceuticals are bogus. This percentage is higher in some countries, such as Colombia, where up to 40% of all medications are believed to be fake. Until recently, the percentage of bogus medications in the United States has been virtually negligible due to a tightly controlled regulatory system has made it extraordinarily difficult for counterfeiters to sell or distribute suspect medications. However, the recent explosion of Internet drug sales from other countries and increasingly sophisticated counterfeiting techniques have substantially increased the amount of fraudulent drugs entering the United States.

Product diversion has also occurred on many of the aforementioned goods. Such diversion could result in the sale and distribution of goods which do not comply with the product specifications required in the markets they are sold. For example, motorcycles intended to be sold without catalytic converters in a region with lower air pollution standards might be diverted to a region which does require such catalytic converters. Other negative effects include price inequities in certain markets, loss of exclusivity by some manufacturers or distributors, and damage to the goodwill, patent rights, and trademark rights of the manufacturer. Such diverted goods are sometimes referred to as "gray market" goods. Since the goods are genuine, it is sometimes difficult to determine whether the goods have been improperly diverted. This is especially true for a variety of goods such as, for example clothing, pharmaceuticals, and cosmetics.

Labels for authenticating the origin and intended market of a good are known in the prior art. Since the persons who counterfeit or divert goods are also inclined to counterfeit such authenticating labels, label structures incorporating covert, authenticating data have been developed. An example of such a label includes both visible data, such as a printed trademark, a manufacturing serial number, or human readable product information, and invisible information which can authenticate the label as one which originated with or under the authority of the manufacturer. Such labels use an invisible marker material which is incorporated in the label. The data stored in the marker becomes readable when the label is exposed to light of a particular wavelength.

SUMMARY OF THE INVENTION

While prior art labels incorporating invisible markers can provide authentication and identification data for a good, the applicants have observed a number of shortcomings associated with their use and manufacture. For example, the data in invisible, optically detected markers cannot be reliably detected or read when printed or placed over black text because of the black text's light absorption at ultraviolet, visible and infrared wavelengths. Reliable detection and reading of such data over specularly reflective backgrounds, such as silver foil, is similarly difficult because of light scattering. Detection over colored backgrounds is problematical because of the absorption of various wavelengths. Sometimes, the noise in the data signal caused by black text or specular reflection or colors can be compensated for by increasing marker levels to increase the strength of the signal. However, such a solution is expensive, as marker materials (which are often formed from rare earth metals) typically cost about between $1 and $10/gram. Since such prior art labels already require the invisible marker material to constitute as much as 5% of the weight of the label component that they are imbedded in, further increases in the use of such an expensive material is undesirable. Moreover, any substantial increase in the proportion of such marker material compromises the invisibility of the marker and/or detectability of the marker by non-optical means and can also adversely change the physical characteristics of the material that it is imbedded in. High marker concentrations can lead to a change in properties (viscosity, opacity, adhesion etc) of the materials that function as carriers. In addition, the final label/laminate system with high security marker concentrations may appear cloudy or stained depending on the marker and technique employed. Detection and ultimately unauthorized replication (counterfeit) risks increase with high marker loads.

The invention is an improved label and labeling method that substantially reduces the amount of marker material necessary to reliably store and relay invisible product data. To this end, the label of the invention comprises a laminate that includes a light transmissive layer of sheet material, a light transmissive layer of adhesive that detachably affixes the sheet material over the surface of a product, a product package or a label substrate, and an amount of invisible marker incorporated into the sheet material or adhesive that contains invisible information detectable by light having a selected wavelength. The amount of marker selected is sufficient to allow information in the marker to be detected only when the laminate is affixed over a surface that provides a selected optical background that maximizes the detectability of the marker. In the preferred embodiment, the selected background is a white background. The ability of the label laminate to be removed from the surface of a product, a product package or a label substrate and positioned over such a background eliminates the optical interference associated with most backgrounds and greatly reduces the amount of marker material required for reliable detection a reading. For example, in contrast to the 5 weight percent quantities of marker material used in the prior art, the label laminate of the invention requires a quantity of marker material of only between about 0.01 and 0.001 percent by weight or less.

The invisible information incorporated in the marker may be as simple as the presence of the marker, or it may take the form of a specific pattern formed by the marker. Examples of such patterns include one and two-dimensional bar codes capable of storing information in digitized form, as well as herringbone, alphanumeric and other repetitive patterns and patterns formed from varying densities of marker material capable of storing information in analogue form.

Marker in particulate form may be mixed directly with the material used to form the sheet material layer and/or the adhesive layer, or positioned between these two layers. A pattern of marker may also be printed on a surface of the sheet material layer or the adhesive layer by an ink or varnish containing fine particles of the marker. Any number of printing techniques may be used to print the marker on one of the surfaces of the label laminate, including thermal transfer, electro-photographic, flexography, gravure, offset, and ink-jet.

The label may further include a label substrate that the layer of adhesive of the laminate detachably affixes the sheet material layer to, wherein the optical background provided by the surface of the label substrate interferes with the readability of the data contained within the marker. The background provided by the label substrate may be selected to conceal any visible traces of the existence of a marker on the laminate or to make detection of the marker difficult if not impossible, even when the label laminate is exposed to light of the selected wavelength that renders the information incorporated into the mark readable. The label substrate may also contain visible graphics or product information.

The marker may be a fluorescent or phosphorescent material, and the selected wavelength that the marker is exposed to may be the excitation wavelength of the fluorescent or phosphorescent material. The selected excitation wavelength may be within the ultraviolet, visible or infrared range. While the light emitted by the fluorescent or phosphorescent marker material will be a different wavelength than the excitation wavelength, the emitted light may also be within the ultraviolet, visible or infrared range. When the emitted light is in the visible range of wavelengths, the detection of the information incorporated in the marker may be readable by the unaided human eye or it may be machine-readable. The marker may also be a material that absorbs an ultraviolet or infrared wavelength, and the selected wavelength may be the wavelength that is absorbed by the marker. In such an embodiment, detection of the information would be by a reading device capable of "seeing" the dark patterns generated when the marker was exposed to the absorbed ultraviolet or infrared wavelength. Two or more markers with different excitation or absorption wavelength properties may be incorporated, imbedded, or printed onto one of the label laminate components to render counterfeiting of the label laminate more difficult.

Finally, the invention also encompasses a method for labeling products and product packages with invisible information. This method generally comprises the steps of (1) providing a layer of light transmissive sheet material with a light transmissive layer of adhesive that detachably affixes the sheet material layer to a surface; (2) providing an amount of invisible marker to either the sheet material or the adhesive that contains invisible information that is detectable by light having a selected wavelength, wherein the amount of marker selected is sufficient to allow information in the marker to be detected only when the laminate is affixed over a surface that provides a selected optical background; (3) detachably affixing the layer over a surface of one of a label substrate or product or product package; (4) removing the label laminate from the surface of one of a label substrate or product or product package and placing it over a surface having the selected optical background; and (5) exposing said marker with light having the selected wavelength and detecting the emitted light containing the information.

DETAILED DESCRIPTION OF THE INVENTION

Figure 1:
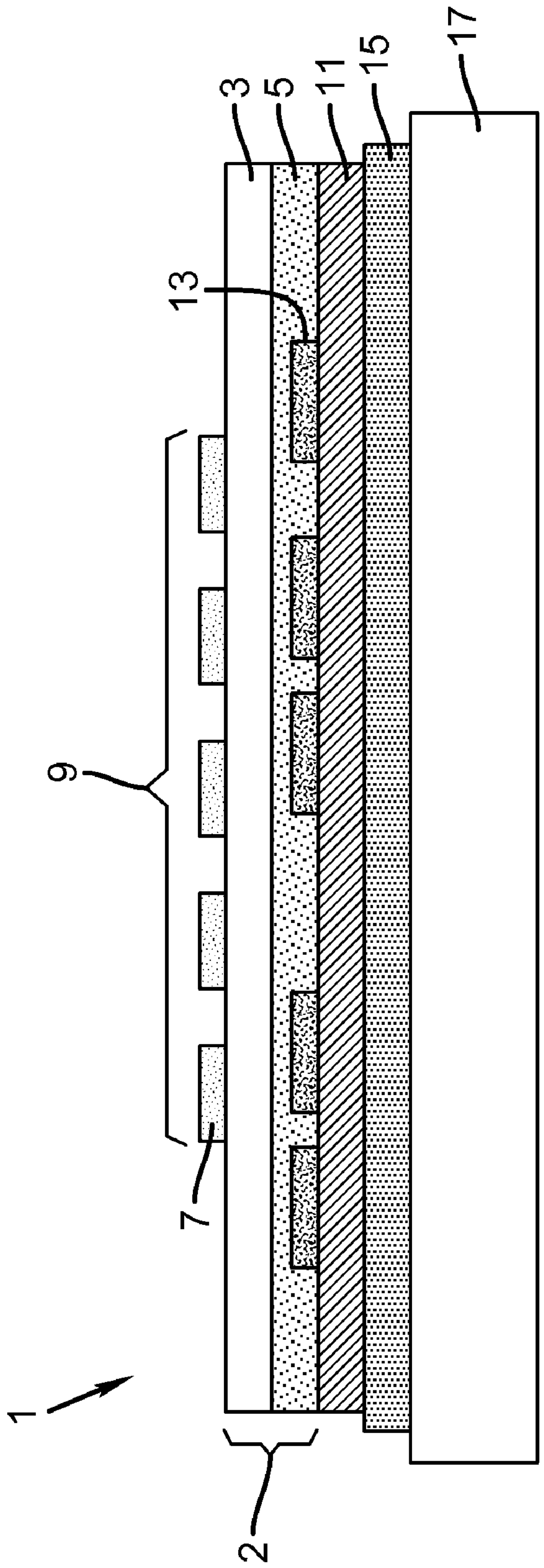
FIG. 1 is side cross sectional view of one embodiment of the label laminate of the invention adhered to a product or product package that includes a label substrate with carbon black printing thereon, wherein the invisible marker is printed in a pattern on the upper surface of the light transmissive sheet material of the laminate.

With reference to FIG. 1, wherein like numerals designate like components throughout all of the several figures, a first embodiment of the label 1 of the invention comprises a label laminate 2 formed from a layer of light transmissive sheet material 3 and a layer of adhesive 5.

The light transmissive sheet material 3 is preferably transparent, and may be a flexible film formed from an, extrudible polypropylene resin such as bi-axially oriented polypropylene (BOPP). Such film has good clarity, resistance to UV light, excellent chemical and abrasion resistance, and a smooth surface. Polyester and polyolefin films may also be used. Film thickness preferably ranges from 0.5 to 2 mil, although smaller and greater thicknesses are also within the scope of the invention. Specific examples of films which may be used to form layer 3 include THERMLfilm, Select 10852, 1 mil, available from Flexcon located at www.flexcon.com, and 2 mil clear BOPP sold by Fasson Roll North America located at www.fasson.com, and Fasclear 350, 3.4 mil polyolefin film also available from Fasson Roll North America.

The light transmissive layer of adhesive 5 can be any one of a number of transparent pressure sensitive adhesives (PSAs), including alkyl (meth)acrylate based adhesives and latex based adhesives, and is preferably transparent. A specific example of such an adhesive is 3M Fastbond™ Pressure Sensitive Adhesive 4224NF (Clear) available from 3M Company located in Minneapolis, Minn. Film thickness of the adhesive layer 5 preferably ranges from 0.5 to 2 mil, although smaller and greater thicknesses are also within the scope of the invention. While both the layer of transmissive sheet material 3 and the layer of adhesive 5 are preferably transparent, they may also be translucent.

The label laminate 2 also includes an invisible marker 7 that contains information. In the case of the first embodiment label 1 illustrated in FIG. 1, the marker 7 is formed from a particulate marker material that is mixed with a carrier (such as a clear, flexible varnish) to form a transparent ink. The transparent ink is then printed in a pattern 9 on the upper surface of the layer of transparent sheet material 3. The pattern can be alpha numeric, geometric (such as a herringbone pattern), a logo, a geometric shape, or a linear or two-dimensional barcode. Printing may be accomplished by thermal transfer, flexography, gravure, offset, and inkjet. Materials used as markers may be of a light emissive type, a light reflective type, or a light absorptive type. In all cases, the marker material is illuminated with light from an incident light source which may have a UV wavelength (250-400 nm), a visible wavelength (400-700 nm) or IR wavelength (700-2000 nm). The marker 7 will emit, reflect, or absorb light, ideally in a contrasting manner with respect to the background. Thus the resulting marker image signals can appear either higher or lower in intensity as compared to the background. Given an appropriate imaging device, or reader, one can detect both the presence of the marker 7, and any information-containing pattern 9 the marker 7 is arranged in, and thus verify its authenticity by virtue of contrasting marker image signals as compared to the background.

The label 1 further includes a label substrate 11. The label substrate 11 is preferably the same size and shape of the label laminate 2 such that the outer edges of the label laminate 2 are concealed when it is removably affixed to the upper surface of the label substrate 11 via the layer of adhesive 5. The substrate may be formed from any one of a number of paper or plastic sheet materials and preferably provides a background which conceals the presence of the marker 7. Such concealing backgrounds include specular (i.e. metallic or glassy) backgrounds, variable ink backgrounds and hologramic backgrounds for the printed information 13. The label substrate 11 may have printed information 13 on its upper surface that provides optical interference that further impairs both the detection and the reading of the information in the marker 7. Such printed information 13 may be printed in a visible, dark saturated color ink or carbon-black based ink or a combination of both. The combination of the light absorptive properties of the printed information 13 and the light scattering properties of the upper surface of the label substrate 11 renders the marker 7 difficult, if not impossible to detect either visually or with a specialized light source.

Finally, the label 1 includes a second layer of adhesive 15 for affixing the label 1 to the surface 17 of either a product or a product package. The layer of adhesive 15 may be either permanent or temporary and need not be transparent or light transmissive. Any one of a number of commercially available adhesives may be used to form the second layer of adhesive 15.

Figure 2:
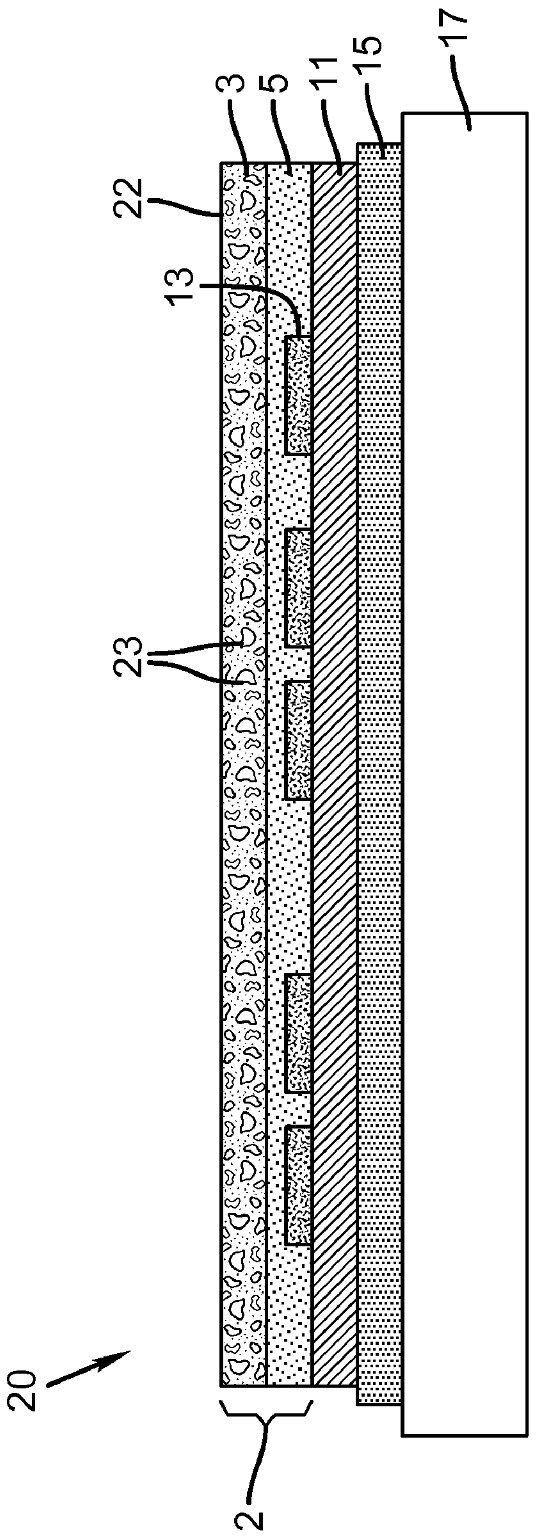
FIG. 2 is a second embodiment of the invention which is structurally identical to the embodiment of FIG. 1 with the exception that the invisible marker is dispersed in the material forming the light transmissive sheet material of the laminate.

FIG. 2 illustrates a second embodiment of the label 20 of the invention which is structurally the same as the first described embodiment of label 1, with the exception that the marker 22 is uniformly distributed throughout the material forming the transparent transmissive sheet material 3. In this embodiment, authenticity of the label is determined by the detected density of the marker 22. In a variation of this embodiment, a second marker 23 having different optical properties may be mixed in a preselected proportion with the marker 22, and authenticity may be determined not only by detecting the presence of both markers 22 and 23, but by determining whether their relative proportions correspond to the preselected proportions.

Figure 3:
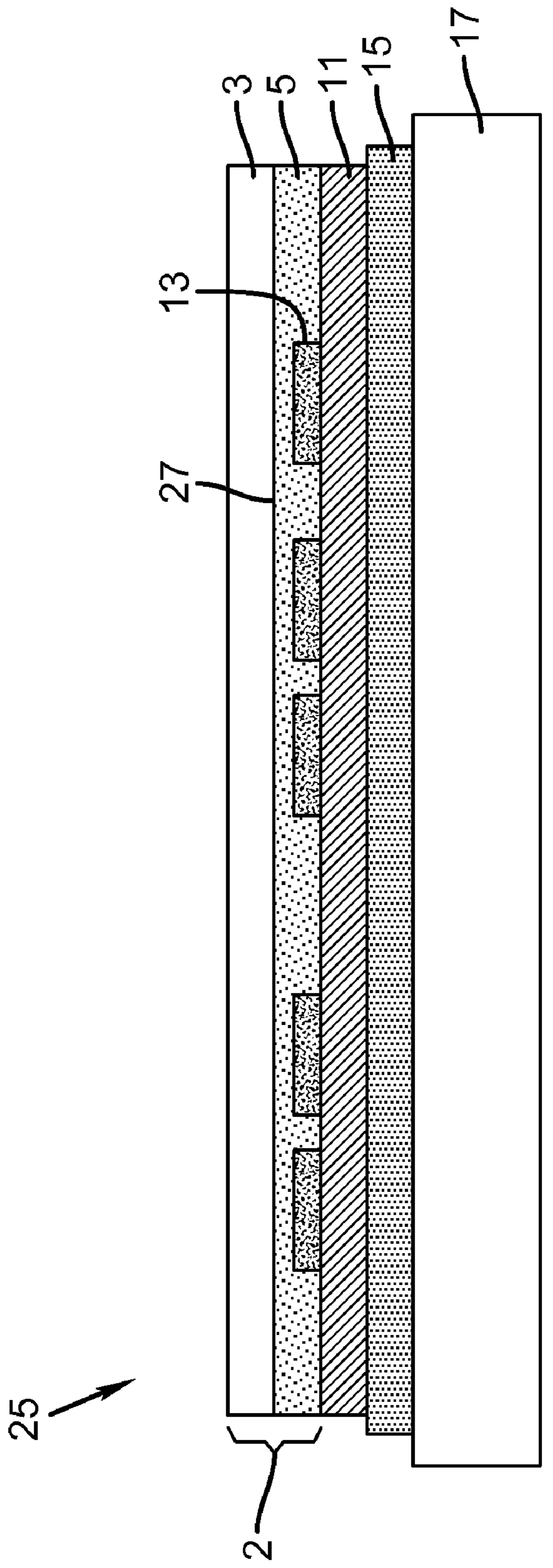
FIG. 3 is a third embodiment of the invention which is structurally identical to the embodiment of FIG. 1 with the exception that the invisible marker is dispersed in the material forming the adhesive layer of the laminate immediately beneath the light transmissive sheet material of the laminate.

FIG. 3 illustrates a third embodiment of the label 25 of the invention which is structurally the same as the first described embodiment label 1, with the exception that the marker 27 is uniformly distributed throughout the material forming the layer of adhesive material 5. While not specifically shown in FIG. 3, one or more second markers, each having different optical properties, may be mixed in with the first marker 27 in selected proportions such that authentication is achieved by optically determining if the relative proportions of the several markers correspond to the preselected proportions.

Figure 4:
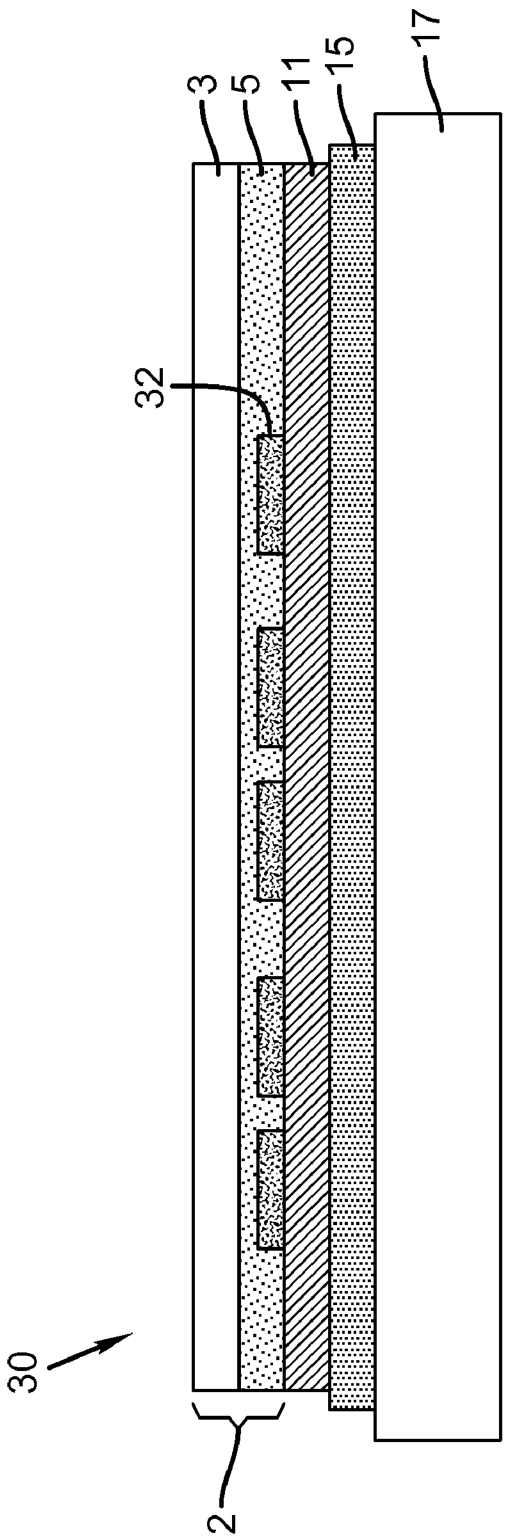
FIG. 4 is a fourth embodiment of the invention which is structurally identical to the embodiment of FIG. 3 with the exceptions that the invisible marker is backside printed in the material forming the adhesive layer of the laminate immediately beneath the light transmissive sheet material of the laminate, and the label substrate has no carbon black printing thereon.

FIG. 4 illustrates still another embodiment of the label 30 of the invention which is structurally the same as the first described embodiment label 1, with the exception that the marker 32 is formed from a marker material that is mixed with a carrier (such as a clear, flexible varnish) to form a transparent ink which is then printed in a pattern 9 on the lower surface of the layer of transparent adhesive 5.

Figure 5:
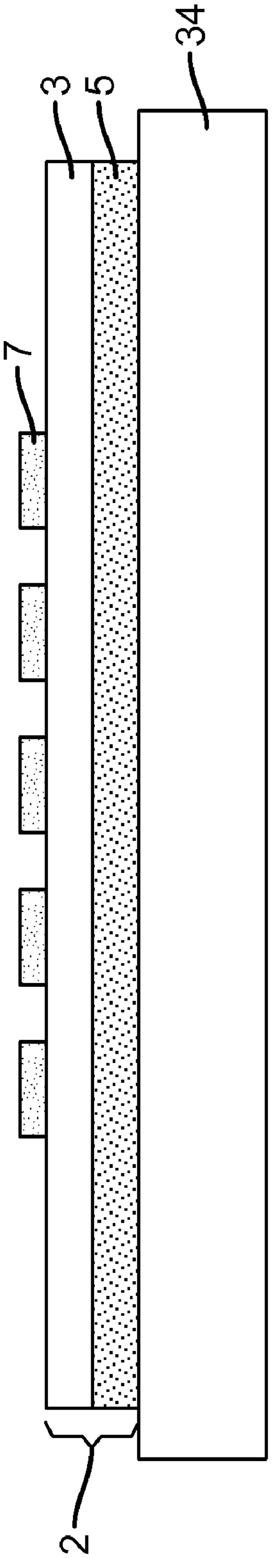
FIG. 5 illustrates a label laminate consisting of the light transmissive sheet material and layer of adhesive that have been peeled off of the label substrate illustrated in FIG. 1 and affixed to a non-interfering optical background.
Figure 6:
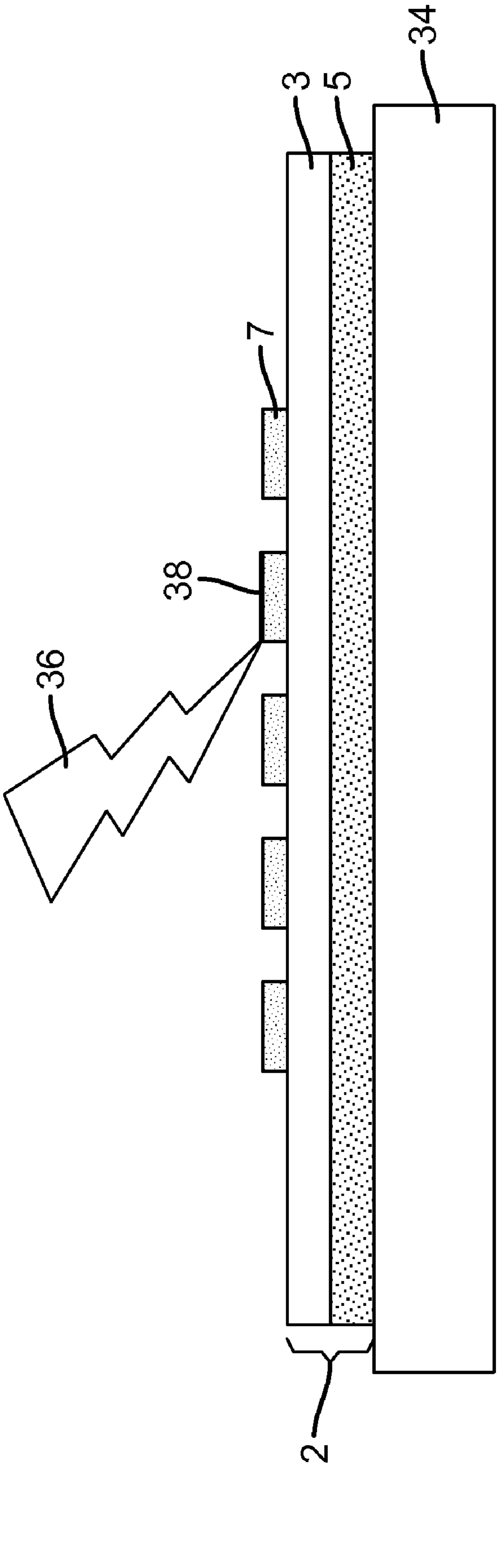
FIG. 6 illustrates the exposure of the label laminate illustrated in FIG. 5 to light having a wavelength that excites or is absorbed by the marker printed on the top surface of the sheet material.

FIGS. 5 and 6 illustrate the operation of the label laminate 2. Here, the label laminate 2 from the embodiment of the label illustrated in FIG. 1 has been peeled off of the label substrate 11 and affixed, via the adhesive layer 5, to a background surface 34 that optimizes the detectability and the readability of the marker 7. Incident light 36 of a selected wavelength is applied over the surface of the marker 7, resulting in reflected or emitted light 38. Emitted light 38 may be the same or a different wavelength than the incident light 36. When the marker 7 is formed from an emissive material which undergoes photonic excitation when exposed to light having a selected wavelength incident light 36, the emitted light is of a different wavelength emitted light 38. This emitted light 38 can be in virtually any wavelength including, UV, visible or IR. Again, with an appropriate imaging device, one can detect the presence of security marker via recognition of localized areas of emitted light 38, and can further read the information incorporated therein.

The following table summarizes the nature of incident and emitted wavelengths of light for emissive markers 7:

| Wavelength (λ) Summary | | |
|---|---|---|
| Type | Incident/Excitation | Emitted |
| Represented by | A | B |
| λ Wavelength Range | UV->Visible->IR | UV->Visible->IR |
| Comparison | A can be > or < B | B can be > or < A |

In the case where λB<λA, an up-converting property of a security marker is utilized. Materials that exhibit this property include certain phosphors and organic dyes. Typically high power incidence radiation, such as obtained with laser sources is required to obtain an up-converted emission. Wavelength shifts include IR to shorter IR, IR to visible, visible to shorter visible. Examples of such materials include, anti- Stokes pigments "A274" (IR to green), "A225" (IR to red) available from Epolin, Inc., Newark, N.J. USA (www.epolin-.com). In the case where λB>λA, the emissive material is functioning in a down converting mode. Lower power light sources, such as light emitting diodes, incandescent and fluorescent bulbs can be used to excite down converted emission responses. Many dyes and phosphors exhibit this property. Wavelength shifts include UV to visible, visible to longer visible, visible to IR, IR to longer IR wavelengths. A few examples of such materials include "L-142, L-212, L-88", (UV to visible) available from Beaver Luminescers, Newton, Mass. USA (www.luminescers.com). A variation on excitation emission utilizes the variation in temporal profile of the intensity of emitted light over time. The unique time signature of the marker 7 is thus confirmed. U.S. Pat. No. 6,996,252 provides an example of the use of decay time differences to verify authenticity of a document. All emissive materials can be verified by relative intensity decay measurement, with a reader designed to detect responses in the appropriate time regime.

In the case where the marker 7 is light absorptive, both the incident 36 and the emitted light 38 will be of the same wavelength, the image signals resulting from differences in absorption of incident light 36, and thus differences in diffuse reflectance of that incident light 36. A properly designed and calibrated imaging device, or reader, will provide image information and will confirm or deny the presence of security maker. An example of a light absorptive marker 7 is FHI9072 from Fabricolor Holding, www.fabricolorholding.com.

Figure 7A:
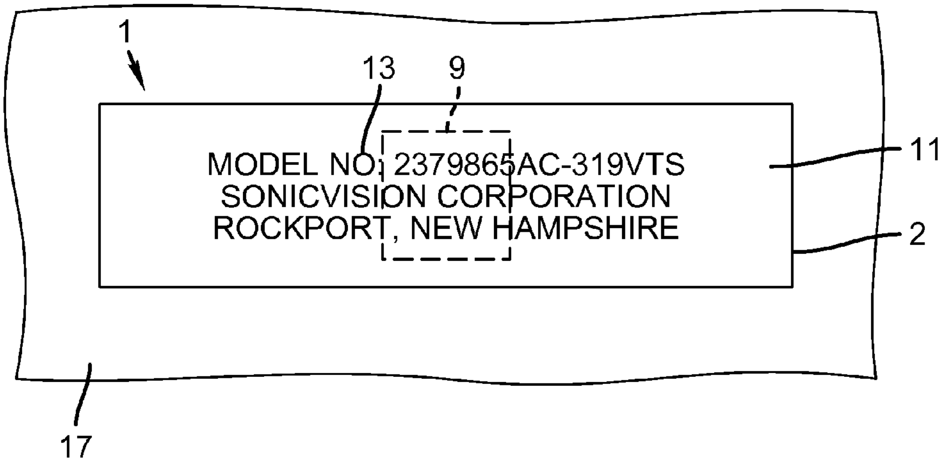
FIGS. 7A-7D illustrate the method of the invention with the label laminate in plan view, including the steps of peeling off the label laminate from a label substrate having optically interfering carbon black printing, affixing the peeled off laminate to an optically non-interfering background, and exposing the laminate to a wavelength of light that excites or is absorbed by the marker printed on one of the layers of the laminate to expose a two-dimensional bar code.

FIGS. 7A-7D illustrate the method of the invention with the label 1 in plan view. As illustrated in FIG. 7A, a label 1 such as that described with respect to FIG. 1 is first adhered to the surface 17 of a product or product package. Such a label includes human readable printed information 13 in a carbon-based ink that is printed on a label substrate 11. Label 1 further includes a transparent label laminate 2 that is adhered over the label substrate 11 via adhesive layer 5 and which is further dimensioned the same as the label substrate 11 so as to appear to be an integral part of the label 1. The transparent label laminate 2 includes an invisible, digitized pattern 9 of marker 7 which is a two-dimensional bar code in this example. The "dark" squares of the two dimensional bar code are formed by digitized pattern of marker 7 distributed at a density of only between about 0.01 and 0.001 weight percent. The distribution density is dictated by the reading device sensitivity. In this example, label substrate 11 is aluminized so as to provide a shiny, specularly reflective background. The combination of the light absorptive carbon-black printed information 13 and the specular background provided by the surface of the label substrate 11 renders both the presence of the marker 7 in the laminate as well as the information embodied therein undetectable with all but the most sensitive detection devices.

Figure 7B:
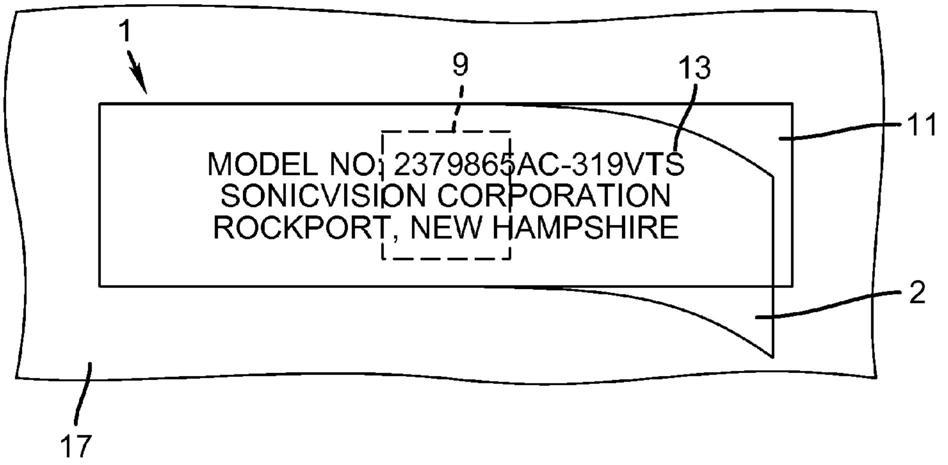
Figure 7C:
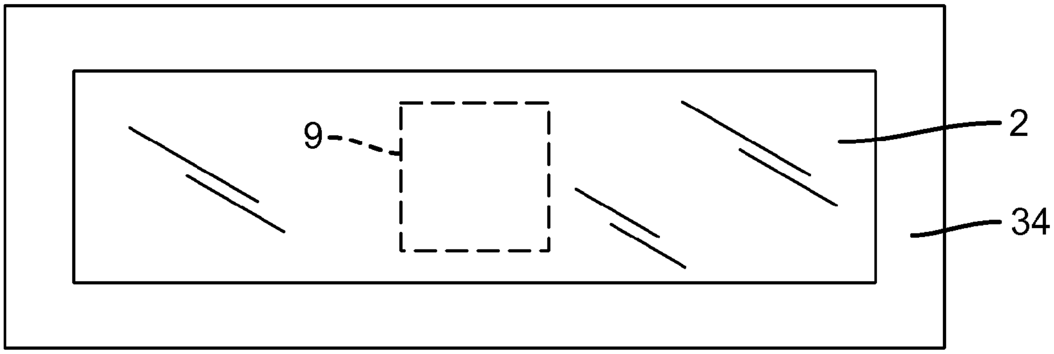

In the second and third steps of the method illustrated in FIGS. 7B and 7C, the label laminate 2 is peeled off of the label substrate 11 and adhered, via the adhesive layer 5, to a background surface 34 that provides an optimal optical background for the detection and reading of the marker 7 in the pattern 9. In most cases, surface 17 will provide a white, diffusively reflecting background.

Figure 7D:
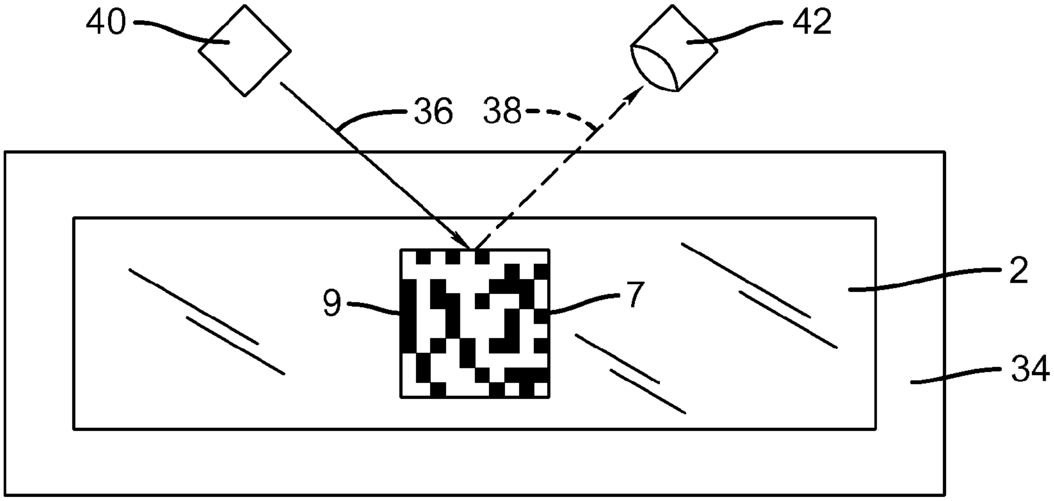

In the fourth step of the method illustrated in FIG. 7D, the label laminate 2 is exposed to incident light 36 of a selected wavelength from a light source 40.

Incident light source 40 may be simple illumination devices such as UV lights of varying form, (black lights, UV tubes, UV diode array "flashlights"), IR diode arrays, IR pens, visible LEDs, and laser diodes. When the emitted light 38 is both visible and human readable, the light source 40 may also constitute the reader 42, as the information embodied within the marker may be gleaned from simple visual observation. When the emitted light 38 is either invisible to the human eye, or if the emitted light is visible, but the pattern 9 is machine readable only, then the combination of an incident light source 40 and a reading device 42 constitutes the reader, as both a light source 40 and a reading device 42 are necessary to read the information embodied within the marker 7.

EXAMPLE 1

Thermal transfer ribbon is prepared with a UV excitable material, UVXPBR. This particular material has the property of emitting red visible light after excitation with UV light, as described at www.maxmax.com. The UVXPBR is mixed with a clear resin (15% resin, 85% solvent, primary component 2-butanone) at a concentration of 1000 parts per million (ppm). This is accomplished by dissolving 0.03 g UVXPBR in 30 g resin solvent mixture and stirring to solution at room temperature. The resulting clear solution is hand coated on pre-slit 4" wide thermal transfer ribbon with a number 4 Mier rod. Coated thickness after solvent evaporation is about 1 micron and the marker content in the resin is about 6667 ppm. Several hand coatings are completed in series and the ribbon is wound, coated side out, on a new 1" core.

The freshly prepared ribbon was threaded onto a Zebra model ZM400 thermal transfer printer. Along with this ribbon, 1" round clear label laminates 2 produced by laminating a clear polyester base-liner label with Flexcon Thermlfilm select 10852 1 mil gloss polyester film are threaded into the printer. A data-containing pattern 9 consisting of 10×10 DataMatrix 2-dimensional bar code, with an edge length of 1.25 cm, was printed on the label laminate 2 via thermal transfer.

The average marker surface density in a single square of the barcode, containing in the bar code area was 666.7 nanograms/cm2. The average marker density across the barcode area was about 360 nanograms/cm2 (since only about 46% of the bar code area was covered with marker). The average marker density across the 1" round clear laminate 2 was 110 ng/cm2.

The procedure described above was repeated, but with a marker level one-tenth that just described. This procedure produced label laminates 2 where the average marker surface density in a single square of the barcode, containing in the bar code area was 66.7 nanograms/cm2. The average marker density across the barcode area was about 36 nanograms/cm2 (since only about 46% of the bar code area was covered with marker). The average marker density across the 1" round clear label laminate 2 was 11 ng/cm2.

The resulting transparent label laminates 2 containing marker 7 at the two different levels were applied to four different optical background surfaces 34 to compare the detectability of the marker 7 and the readability of the data-containing pattern 9. The first optical background was a white 3×5 card that had been treated with optical brightener. The second optical background was card stock that did not contain optical brightener. The third optical background was metallic poly sheeting, and the fourth optical background was black construction paper.

The marker printed pattern 9 for the label laminates 2 containing marker 7 at the two different levels was detected and read over the four different backgrounds by three different methods.

Figure 8:
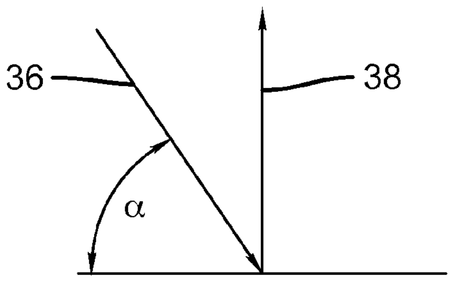
FIG. 8 illustrates the relative angular orientation a of an illumination source of incident light and the optical detection component of the marker-reading device described with respect to Example 1.
Figure 9A:
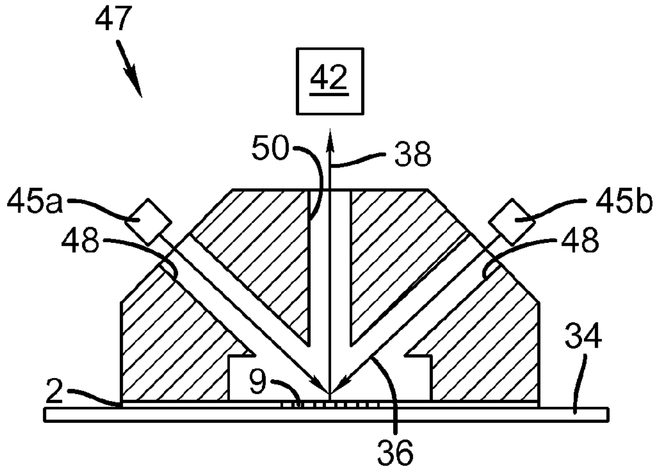
FIGS. 9A and 9B are a cross-sectional view and top view, respectively of an optical component holder for the marker-reading device described with respect to Example 1.
Figure 9B:
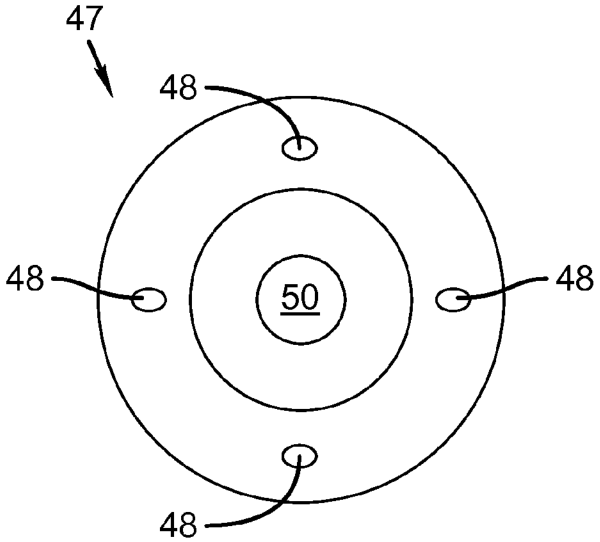

In the first method, incident light 36 was directed toward the surface of the label laminate 2 at an angle α of 45° and the resulting emitted light 38 was read at an angle of 90° as illustrated in FIG. 8. This was implemented by LEDs 45*a*, 45*b* in combination with an optical component holder 47 as illustrated in FIGS. 9A and 9B. Component holder 47 overlies and is centered over the pattern 9 printed on the label laminate 2. The label laminate 2 in turn overlies an optical background surface 34 which is one of the four aforementioned sheet materials. This component holder 47 is constructed of plastic and is approximately 2 inches in diameter. LEDs 45*a*, 45*b* are placed in alignment with two of the four angled holes 48. The LEDs 45*a*, 45*b* are oriented 90° degrees with respect to one another, 45° from the plane of the sample label laminate 2, and 45° from the placement of the photodiode, as depicted in FIG. 9A. The remaining two angled holes 48 for LEDs were left empty. The LEDs 45*a*, 45*b* were Roithner (located in Vienna, Austria) part number UVLED375-10-30 LEDs operated with 20 mAmp drive current. A reader 42 in the form of an Ocean Optics USB2000 model fiber optic spectrometer with a photodiode, charge coupled device (CCD) was optically coupled with hole 50 in the component holder 47 via a fiber optic cable (not shown).

In the first detection method, data was collected as a function of wavelength. The UVXPBR marker has a single emission at 614.26 nm and the intensity of the emission detected by the Ocean Optics spectrometer at this wavelength is reported in Table 1A as the marker signal. In Table 1A, it is clear that this emission was diminished when the clear label was read over a black or metallic background and enhanced over a white background. An enhanced signal was obtained when a white reading background was used and an optimum signal was obtained if the white background was itself non-emissive, in other words, if it did not contain optical brightener. (Optical brightener is added to most white paper to enhance appearance.) The signal enhancement was most noticeable at the higher marker level. The lower marker level, especially on black, gave signals close to the detection limit of the spectrometer. A blank measurement was made on a white Spectralon sample. This sample is highly, diffusely reflective.

TABLE 1A

Detectability of Marker UVXBR Data at 614.26 nm for Label with Laminate in Example 1 with a Photodiode CCD Detector

| Example type | Marker Level in bar code area (ng/cm2) | Optical Background | Signal strength at 614.26 nm | Relative signal strength at 614.26 nm |
|---|---|---|---|---|
| | | High marker level | | |
| comparison | | Blank* | 0 | 0 |
| comparison | 360 | 1d - black | 83 | 1 |
| comparison | 360 | 1c - metallic | 234 | 2.8 |
| invention | 360 | 1a - white with optical brightener | 567 | 6.8 |
| invention | 360 | 1b - white no optical brightener | 963 | 11.6 |
| | | Low marker level | | |
| comparison | | blank | 0 | 0 |
| comparison | 36 | black | 20 | 1 |
| invention | 36 | 1a - white with optical brightener | ~50* | 2.5 |
| invention | 36 | 1b - white no optical brightener | 79 | 4 |

In the second method of detection, no optical component holder 47 was used. Instead, the arrangement illustrated in FIG. 7D was used with the light source 40 and reader 42 oriented at an approximately 45° angle from the plane of the label laminate 2. In this method, the reader 42 was a digital Nikon 995 camera having a CCD array which was placed on a tripod approximately 2.4 inches from the label laminate 2 to detect the marker pattern 9. A 550 nm long pass filter was placed in front of the Nikon 995 camera to reduce noise in the signal. The light source 40 used to illuminate the label laminate 2 was a flashlight comprised of five 365 nm LEDs and with an output power of approximately 8 to 10 mW. Illumination and detection was conducted in a darkened room. Images of the pattern 9 comprised of the reflected and emitted light from the pattern 9 were captured using ISO800, 1-second exposures. Similar images were captured with no illumination from the light source 40. The illuminated and non-illuminated images were subtracted from one another using ImageJ software, (www.rsb.info.nih.gov/ij). Examination of the subtracted image was used to determine marker detectability. The subtracted-image 2D barcode was read and decoded with software from Omniplanar (Subsidiary of Honeywell, www.omniplanar.com) although software from Labview (National Instruments Corporation (www.ni.com/labview)) could also be used. It is possible to visually detect the presence of the pattern 9 but not have a clear enough image of the pattern 9 to decode the barcode. The detectability and readability of the pattern 9 is tabulated in Table 1B as a function of the optical background behind the clear label laminate 2. The marker was most detectable and most decodable on white, diffusively reflective backgrounds.

TABLE 1B

Detectability of Marker UVXBR Red Emission Using a Digital Camera with a 550 nm Long Pass Filter. Decodability Was Determined Using Standard 2D Bar Code Detection Software.

| Example type | Marker Level in bar code area (ng/cm2) | Optical Background | Detectability and Decodability of Marker data |
|---|---|---|---|
| | | High marker level | |
| comparison | 360 | 1d - black | Mark was detectable but not decodable |
| comparison | 360 | 1c - metallic | Mark was detectable but not decodable |
| invention | 360 | 1a - white with optical brightener | Mark was detectable and decodable |
| invention | 360 | 1b - white no optical brightener | Mark was detectable and decodable |
| | | Low marker level | |
| comparison | 36 | black | Not detected |
| invention | 36 | 1a - white with optical brightener | Mark was detectable but not decodable |
| invention | 36 | 1b - white no optical brightener | Mark was detectable but not decodable |

In the third method of detection, the same orientation between the light source 40 and reader 42 was used as described with respect to the second method. Again, a flashlight comprised of five 365 nm LEDs and with a output power of approximately 8 to 10 mW was used to illuminate the label laminate 2 in a darkened room. However, emitted and reflected light from the label laminate 2 was examined by eye for each of the four background surfaces 34 of black, reflective, white plus optical brightener and white sheet materials. Results are summarized in Table 1C. In this method of detection, the black background was optimum for a readable barcode. This is because the human eye has difficulty distinguishing a weak red signal superimposed on stronger blue-white emissions from optical brightener. The metallic background also gave a sharper image, as perceived by eye, than the white substrates. This example demonstrates that the optimal background for reading may depend on the method of detection.

TABLE 1C

Human Detectability of Red Emission from Marker UVXBR

| Example type | Marker Level in bar code area (ng/cm2) | Optical Background | Quality of emissive red marker image |
|---|---|---|---|
| High marker level | | | |
| invention | 360 | 1d - black | Dim but sharp, sharper than 1c |
| invention | 360 | 1c - metallic | Dim but sharp |
| comparison | 360 | 1a - white with optical brightener | Obscured by white-blue optical brightener emission |
| comparison | 360 | 1b - white no optical brightener | Visible but obscured by white-blue emission of substrate |
| Low marker level | | | |
| invention | 36 | black | Barely detectable as red blur |
| comparison | 36 | 1a - white with optical brightener | Not detectable |
| comparison | 36 | 1b - white no optical brightener | Not detectable |

EXAMPLE 2

A thermal transfer ribbon is prepared with A-225 up-converting IR excitable material available from Epolin, Inc. This particular material has the property of emitting green visible light after excitation with IR light, as described at www.epolin.com. The A-225 material is mixed with a clear resin (15% resin, 85% solvent, primary component 2-butanone) at a concentration of 1000 ppm. This is accomplished by mixing 0.03 g A-225 with 30 g resin solvent mixture and vigorously stirring to dispersion at room temperature. The resulting mixture is hand coated on pre-slit 4" wide thermal transfer ribbon with a number 4 Mier rod. Coated thickness after solvent evaporation is about 1 micron and the marker content in the resin is about 6667 ppm. Several hand coatings are completed in series and the ribbon is wound, coated side out, on a new 1" core. The freshly prepared ribbon is threaded onto a Zebra model ZM400 thermal transfer printer. Along with this ribbon, 1" round clear labels, produced by laminating a clear polyester base linered label with Fasson 2 mil clear BOPP 7525/S4900, are threaded into the printer. Patterns 9 are printed on the label laminate 2 via thermal transfer.

The resulting transparent label laminates 2 were applied to a series of optical background surfaces 34 including white 3×5 cards, metallic poly sheeting, and black construction paper. Each sample label laminate 2 was illuminated with a light source 40 in the form of a hand held infrared laser, and visually observed. Marked patterns 9 were visible and were green in color when viewed on the label applied to white 3×5 cards. By contrast, when freshly printed label laminates 2 were applied to metallic poly sheeting, green emission was not visually detectable. Similarly, no emission was visually detected when infrared laser light was applied to a label laminate 2 overlying black paper.

This example illustrates that an invisible pattern 9 of marker 7 could be printed on a laminate that overlies a highly reflective or black surface, which could be either the surface of a label substrate 11 or the surface of a product or product package. Detection would be accomplished by removal of the marked label laminate 2, affixing the laminate on white paper followed by illumination with IR light and visual detection with a human eye or a camera or other reading device 42.

EXAMPLE 3

In this example, an IR absorbing dye was dissolved in 2-butanone, then mixed into a removable acrylic adhesive mixture at a concentration of 5000 ppm. The dye used was FHI9072, described on www.fabricolorholding.com. The adhesive mixture was coated on 2-mil polyester film to a thickness of 1 mil., thus forming the adhesive layer 5 of a label laminate 2. This resulted in a marker concentration of 12.5 microgram/cm2. The resulting label laminate 2 was then adhered over a polyester label substrate 11 and die-cut to shape. The resulting label 1 had no apparent visible colorations due to the IR dye.

Detection of the dye was accomplished via IR reflectance. The light source 40 was a digital Nikon 995 camera modified to remove the IR filter that normally covers the CCD array. The reader 42 used was a digital Nikon 995 camera in which a 650 nm long pass filter was placed in front of the lens in order to reduce noise in the signal. The camera was placed in a tripod approximately 2.4 in from the sample. An array of 910 nm IR LEDs was used to irradiate the label laminate 2 in a darkened room. Images of the sample label laminate 2, comprised of the reflected light from the sample, were captured using ISO800, 1-second exposures. When a marked laminate was applied over a black surface, all incident IR light is absorbed and no signal is detected. When the removable laminate/adhesive system was removed and applied to a white background, the IR reflectance scan indicated the presence of dye due to low reflectivity as compared to the black surface.

These examples demonstrate the usefulness of detecting security markers by reading through a clear label placed over an optimal optical background. This invention can be applied to any type of emissive or reflective optical marker 7 and any type of detection system that measure reflected and/or emitted light. If more sensitive detection systems are used, the level of marker 7 used will be lower. If less sensitive detection systems are used, the concentration of marker 7 used will be higher.

Some examples of detection systems are given in the following references: U.S. Pat. No. 7,030,371; EP Patent No. 1 043 681; U.S. Pat. No. 7,079,230; U.S. Pat. No. 6,184,534; and U.S. Pat. No. 5,959,296. Commercial devices which could be used as detection devices for this application include document examination and verification devices such as the VSC5000, VSC6000 and VSC4 sold by Foster and Freeman. Examples of emissive and absorptive dyes and pigments are also available on the websites of vendors Epolin (www.epolin.com), Fabric Color Holding Inc. (www.fabricolorholding.com/browse.php), Beaver Luminescers (www.luminescers.com/products.html), and LDP LLC dyes and pigments (www.maxmax.com/aSpecialtyInks.htm).

Organic markers may be compounds of the following type: indanones, metal dithiolenes, oxazoles, thiazoles, thiodiazoles, thiazenes, triazoles, oxadiazoles, pyrazolines, oxinates, benzoxazinones, benzimidiazoles, benzthiazoles, phthalazines, thioxanthenes, triarylamines, triarylmethanes, tetraaryldiamines, stilbenes, cyanines, rhodamines, perylenes, aldazines, coumarines, spirooxazines, spiropyranes, cumene, anthranilic acids, terephthalic acids, bartituric acids, and derivatives thereof. Examples of inorganic emissive materials are given in U.S. Pat. No. 6,436,314 and in the reference T. Soukka et al., Journal of Fluorescence, Vol. 15, No. 4, July 2005. Examples of inorganic emissive materials containing rare earth elements are $CaWO_4$:Eu; $CaMoO_4$:Mn, Eu; BaFBr:Eu; $Y_2O_2S$:Tb; $Y_2O_2S$:Er, Yb; $Y_2O_2S$:Er; $Y_2O_2S$:Eu; $Y_2O_3$:Eu; $Y_2O_2S$:Eu+$Fe_2O_3$; $Gd_2O_2S$:Tb; $Gd_2O_2S$:Eu; $Gd_2O_2S$:Nd; $Gd_2O_2S$:Yb, Nd; $Gd_2O_2S$:Yb, Tm; $Gd_2O_2S$:Yb, Tb; $Gd_2O_2S$:Yb, Eu; LaOF:Eu; $La_2O_2S$:Eu; $La_2O_2S$:Eu Tb; $La_2O_2S$:Tb; $BaMgAl_{16}O_{27}$:Eu; $Y_2SiO_5$:Tb, Ce; $Y_3Al_5O_{12}$:Ce; $Y_3Al_{2.5}Ga_{2.5}O_{12}$:Ce; $YVO_4$:Nd; $YVO_4$:Eu; $Sr_5(PO_4)_3Cl$:Eu; CaS:Eu; ZnS:Ag, Tm and $Ca_2MgSi_2O_7$:Ce. Examples of inorganic emissive materials that do not contain rare earth elements are: ZnS:Cu, ZnS:Cu, Au, Al; ZnS:Ag; $ZnSiO_4$:Mn; $CaSiO_3$:Mn, ZnS:Bi; (Ca, Sr)S:Bi; (Zn, Mg)$F_2$:Mn; $CaWO_4$; $CaMoO_4$; ZnO:Zn; ZnO:Bi, and $KMgF_2$:Mn. Examples of emissive dyes which can be used in the application are given in U.S. Pat. No. 6,514,617. Infrared absorbing and emitting dyes which can be used as markers for this invention are referenced in the following table of U.S. Pat. No. 7,068,356 (see below):

TABLE 1D

| Dye Name/No. | Excitation | Emission |
|---|---|---|
| Alcian Blue (Dye 73) | 630 nm | Absorbs |
| Methyl Green (Dye 79) | 630 nm | Absorbs |
| Methylene Blue (Dye 78) | 661 nm | 686 nm |
| Indocyanine Green (Dye 77) | 775 nm | 818 nm |
| Copper Phthalocyanine (Dye 75) | 795 nm | Absorbs |
| IR 140 (Dye 53) | 823 nm | 838 nm |
| IR 768 Perchlorate (Dye 54) | 760 nm | 786 nm |
| IR 780 Iodide (Dye 55) | 780 nm | 804 nm |
| IR 780 Perchlorate (Dye 56) | 780 nm | 804 nm |
| IR 786 Iodide (Dye 57) | 775 nm | 797 nm |
| IR 768 Perchlorate (Dye 58) | 770 nm | 796 nm |
| IR 792 Perchlorate (Dye 59) | 792 nm | 822 nm |
| 1,1'-DIOCTADECYL-3,3,3',3'-TETRAMETHYLINDODI-CARBOCYANINE IODIDE (Dye 231) | 645 nm | 665 nm |
| 1,1'-DIOCTADECYL-3,3,3',3'-TETRAMETHYLINDO TRICARBOCYANINE IODIDE (Dye 232) | 748 nm | 780 nm |
| 1,1',3,3,3',3'-HEXAMETHYL-INDODICARBOCYANINE IODIDE (Dye 233) | 638 nm | 658 nm |
| DTP (Dye 239) | 800 nm | 848 nm |
| HITC Iodide (Dye 240) | 742 nm | 774 nm |
| IR P302 (Dye 242) | 740 nm | 781 nm |
| DTTC Iodide (Dye 245) | 755 nm | 788 nm |

TABLE 1D-continued

| Dye Name/No. | Excitation | Emission |
|---|---|---|
| DOTC Iodide (Dye 246) | 690 nm | 718 nm |
| IR-125 (Dye 247) | 790 nm | 813 nm |
| IR-144 (Dye 248) | 750 nm | 834 nm |

This invention provides a solution to the problem of poor security marker signal response due to substrate optical interferences. Improved optical reading is accomplished by physical separation of a transparent label laminate 2 containing the marker 7 from the rest of the label 1. Once separated, the security-marked label laminate 2 is transferred to a non-interfering optical background surface 34, and an appropriate device 40, 42 reads the information contained in the pattern 9. An indication of authenticity is obtained in a manner which requires only very small quantities of marker material.

The invention has been described in detail with particular reference to certain preferred embodiments thereof, but it will be understood that variations and modifications can be effected within the scope of the invention.

PARTS LIST

| | |
|---|---|
| 1 | label |
| 2 | label laminate |
| 3 | transmissive sheet material |
| 5 | layer of adhesive |
| 7 | marker |
| 9 | pattern |
| 11 | label substrate |
| 13 | printed information |
| 15 | second layer of adhesive |
| 17 | surface |
| 20 | label |
| 22 | marker |
| 23 | second marker |
| 25 | label |
| 27 | marker |
| 30 | label |
| 32 | marker |
| 34 | background surface |
| 36 | incident light |
| 38 | emitted light |
| 40 | light source |
| 42 | reader |
| 45a | LED |
| 45b | LED |
| 47 | component holder |
| 48 | angled holes |
| 50 | hole |

The invention claimed is:

1. A method for labeling products and product packages with invisible information, comprising the steps of:

providing a label laminate that includes a layer of light transmissive sheet material with a light transmissive layer of adhesive;

providing an amount of invisible marker to one of said sheet material and said adhesive that contains invisible information that is detectable by light having a selected wavelength;

wherein the amount of marker selected is sufficient to allow information in the marker to be detected only when the laminate is affixed over a surface that provides a selected, non-interfering optical background;

detachably affixing said laminate over a first surface;

removing said laminate from said first surface;

placing said laminate over a second surface having said selected optical background;

exposing said marker with light having said selected wavelength; and detecting said invisible information.

2. The method of claim 1, wherein said second surface having said selected optical background is a surface having uniform, diffusely reflective properties.

3. The method of claim 2, wherein said second surface having said selected optical background surface is a white surface.

4. The method of claim 1, wherein said first surface that said label laminate is affixed to is a label substrate that conceals said invisible information, and interferes with the detection of said information in said marker.

5. The method of claim 1, wherein the information contained in said marker is the presence or absence of said marker.

6. The method of claim 1, wherein the invisible information contained by the marker is in a pattern formed by the marker.

7. The method of claim 1, wherein said invisible information becomes readable when exposed to a selected wavelength of one of ultraviolet, visible and infrared light, and wherein said reading device exposes said marker to said selected wavelength.

8. The method of claim 7, wherein said marker is formed from one of a fluorescent, phosphorescent and infrared absorbing material.

9. The method of claim 1, wherein said layer of sheet material includes at least two markers that include invisible data, and wherein the invisible data becomes detectable when said markers are exposed to different wavelengths of one of ultraviolet, visible, and infrared light.

10. The method of claim 1, wherein said marker is applied to one or both of said light transmissive sheet material and light transmissive layer of adhesive by printing via one or more of thermal transfer, flexography, gravure, offset and inkjet.

11. The method of claim 1, wherein the first surface consists of a product or a product package.

* * * * *